US012806870B2

(12) United States Patent
Wadsworth

(10) Patent No.: US 12,806,870 B2
(45) Date of Patent: Nov. 24, 2026

(54) METHOD FOR SECURING CORE TO TOOL DURING MACHINING

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 793 days.

(21) Appl. No.: 17/961,395

(22) Filed: Oct. 6, 2022

(65) Prior Publication Data

US 2023/0033757 A1 Feb. 2, 2023

Related U.S. Application Data

(62) Division of application No. 16/551,913, filed on Aug. 27, 2019, now Pat. No. 11,511,502.

(51) Int. Cl.

*B29C 70/54* (2006.01)
*B29C 43/12* (2006.01)
*B29C 43/36* (2006.01)
*B29C 70/44* (2006.01)
*B29L 31/60* (2006.01)

(52) U.S. Cl.

CPC ............ *B29C 70/545* (2013.01); *B29C 43/12* (2013.01); *B29C 43/3642* (2013.01); *B29C 70/443* (2013.01); *B29C 70/54* (2013.01); *B29C 43/36* (2013.01); *B29C 2043/3605* (2013.01); *B29C 2043/3644* (2013.01); *B29C 70/44* (2013.01); *B29L 2031/608* (2013.01)

(58) Field of Classification Search

CPC ............ B29C 2043/3644; B29C 43/12; B29C 43/3642; B29C 2043/3605; B29C 2043/3602; B29C 70/443; B29C 70/44; B29C 70/54; B29C 70/446; B29C 70/545; B29C 43/36; B29C 70/84; B29C 70/86

See application file for complete search history.

(56) References Cited

U.S. PATENT DOCUMENTS 4,065,340 A * 12/1977 Dickerson ............... B29C 70/44 156/289
4,942,013 A * 7/1990 Palmer ................ B29C 43/3642 264/511

(Continued)

FOREIGN PATENT DOCUMENTS

| | | | | |
|---|---|---|---|---|
| DE | 102009010621 | | 12/2010 | |
| KR | 20170081341 A | * | 7/2017 | .......... B29C 70/443 |

OTHER PUBLICATIONS

English Translation for KR 10-2017-0081341 (Year: 2017).*

(Continued)

*Primary Examiner* — Seyed Masoud Malekzadeh
(74) *Attorney, Agent, or Firm* — Stinson LLP

(57) ABSTRACT

A method for preparing a part using a rigid tool surface having a shape. The method includes applying a breather sheet comprising gas-permeable material over the rigid tool surface. A vacuum bag is applied over the breather sheet, and a vacuum pressure is applied underneath the vacuum bag to conform the breather sheet and the vacuum bag to the shape of the rigid tool surface. A resin pre-impregnated ply is applied over the vacuum bag, and the part is positioned over the ply.

21 Claims, 12 Drawing Sheets

(56) References Cited

U.S. PATENT DOCUMENTS 5,242,523 A * 9/1993 Willden .................. B29C 70/44 244/119
5,318,422 A * 6/1994 Erland ................ B29C 43/3607 425/389
5,403,537 A * 4/1995 Seal ................... B29D 99/0014 156/286
5,780,074 A 7/1998 Blonigen et al.
6,173,807 B1 1/2001 Welch et al.
6,620,369 B1 * 9/2003 Mead ...................... B29C 70/44 264/257
6,759,002 B1 * 7/2004 Engwall ................. B23Q 3/086 264/102
7,413,694 B2 8/2008 Waldrop, III et al.
7,875,220 B2 1/2011 Kondo et al.
8,052,831 B2 11/2011 Polus et al.
8,192,662 B2 * 6/2012 Asahara ................ B29C 43/203 264/156
8,251,174 B2 8/2012 Welch et al.
8,298,473 B2 * 10/2012 Dull ........................ B29C 33/18 156/286
8,632,653 B2 1/2014 Brown et al.
9,630,390 B2 * 4/2017 Brown .................... B29C 43/12
9,833,981 B2 12/2017 Louie et al.
9,937,672 B2 4/2018 Dull et al.
10,076,884 B2 9/2018 Duclos et al.
10,207,463 B2 2/2019 Jacob et al.
10,213,968 B2 2/2019 Knutson
10,232,532 B1 3/2019 Prebil et al.
10,335,983 B2 * 7/2019 Hall .................... B29C 43/3642
10,647,070 B2 5/2020 Sanderson et al.
10,710,327 B2 7/2020 Butler
10,889,076 B2 1/2021 Yokomizo et al.
10,899,084 B2 1/2021 Mishra et al.
10,919,193 B2 2/2021 Mai et al.
11,097,524 B2 8/2021 Halbritter
11,440,273 B2 9/2022 Gill
11,440,283 B2 9/2022 Turner et al.
2002/0022422 A1 * 2/2002 Waldrop, III ......... B29C 70/443 264/510
2003/0098520 A1 * 5/2003 Cournoyer ............ B29C 70/549 425/117
2004/0219244 A1 * 11/2004 Filsinger ............... B29C 70/548 425/127
2006/0027314 A1 2/2006 Jones et al.
2006/0172111 A1 * 8/2006 Polus .................... B29C 70/088 428/116
2006/0249868 A1 * 11/2006 Brown .................... B32B 38/04 156/196
2007/0149080 A1 6/2007 Asahara et al.
2007/0251641 A1 * 11/2007 Santos Gomez ..... B29C 70/388 156/510
2008/0124520 A1 * 5/2008 Kondo .................... B23B 51/08 264/156
2008/0210372 A1 * 9/2008 Cumings ................. B29C 70/44 156/286
2009/0252921 A1 10/2009 Bottler et al.
2009/0301641 A1 * 12/2009 Asahara ................ B29C 70/547 156/148
2010/0291258 A1 * 11/2010 Dull ........................ B29C 33/18 425/405.2
2014/0069576 A1 * 3/2014 Brown ................ B32B 38/1808 156/247
2015/0107775 A1 * 4/2015 Louie ................. B65D 33/2566 156/382
2016/0031163 A1 * 2/2016 Wadsworth ........... B29C 70/342 156/64
2018/0079111 A1 * 3/2018 Gordin .................... B29C 43/36
2018/0194085 A1 * 7/2018 Sanderson .............. B29C 70/30
2018/0257272 A1 * 9/2018 Mai ......................... B29B 11/16
2019/0016067 A1 * 1/2019 Yokomizo ............... B29C 43/36
2019/0168481 A1 * 6/2019 Butler ...................... B32B 5/024
2019/0240949 A1 * 8/2019 Turner ...................... B32B 3/30
2019/0315075 A1 * 10/2019 Gill ....................... B29C 70/545
2020/0016880 A1 * 1/2020 Mishra .................... B32B 37/06
2020/0198264 A1 * 6/2020 Christiansen ......... B29C 70/342

OTHER PUBLICATIONS

International Search Report and Written Opinion for related application PCT/US2020/044381, mailed Nov. 11, 2020, 11 pages.
International Preliminary Report on Patentability in related application PCT/U520201044831, mailed Mar. 10, 2022, 8 pages.
European Search Report in related EP Application 20856152.2 dated Aug. 9, 7 pages.

* cited by examiner

METHOD FOR SECURING CORE TO TOOL DURING MACHINING

RELATED APPLICATIONS

The current patent application is a divisional patent application which claims priority benefit to U.S. patent application Ser. No. 16/551,913, filed Aug. 27, 2019, now issued as U.S. Pat. No. 11,511,502, and entitled METHOD FOR SECURING CORE TO TOOL DURING MACHINING, the disclosure of which is hereby incorporated by reference in its entirety into the current patent application.

FIELD OF THE INVENTION

Embodiments of the present invention relate to methods and systems for manufacturing core parts. More particularly, embodiments of the present invention relate to methods and systems for manufacturing core parts that utilize tooling positioned on one side of the part and a flexible bag positioned on the opposite side of the part.

DESCRIPTION OF THE RELATED ART

Finished core parts, such as those used in aerospace applications, often include three-dimensional characteristics such as height, depth, curvature, or contours. Such core parts may need to be maintained in the corresponding three-dimensional configuration while being machined or otherwise worked toward a final state. For example, a honeycomb core may be held in a three-dimensional shape against a mandrel tool while portions of its thickness are shaved or machined away by a tool to further the core's progression toward a final product. Traditional approaches for maintaining the three-dimensional shape cannot adequately retain the core against the mandrel tool, particularly throughout and following heating/curing processes, leading to errors in subsequent machining of the core part. Some adhesive materials that will properly secure the core to the mandrel tool cannot be easily removed, possibly resulting in damage to the core or the tool. Moreover, traditional approaches to maintaining the three-dimensional shape of the core part throughout and following heating/curing processes requires use of a narrowed set of materials in the mandrel tool, leading to increased expense.

BRIEF SUMMARY

Embodiments of the present invention solve the above-mentioned problems and provide a distinct advance in the art of manufacturing core parts. More particularly, embodiments of the invention provide a system and method for manufacturing core parts which improve retention of the core parts against corresponding mandrel tools and reduce the cost of such mandrel tools.

Various embodiments of the invention may also provide a method for preparing a part using a rigid tool surface having a shape. The method includes applying a breather sheet comprising gas-permeable material over the rigid tool surface. A vacuum bag is applied over the breather sheet, and a vacuum pressure is applied underneath the vacuum bag to conform the breather sheet and the vacuum bag to the shape of the rigid tool surface. A resin pre-impregnated ply is applied over the vacuum bag, and the part is positioned over the ply.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
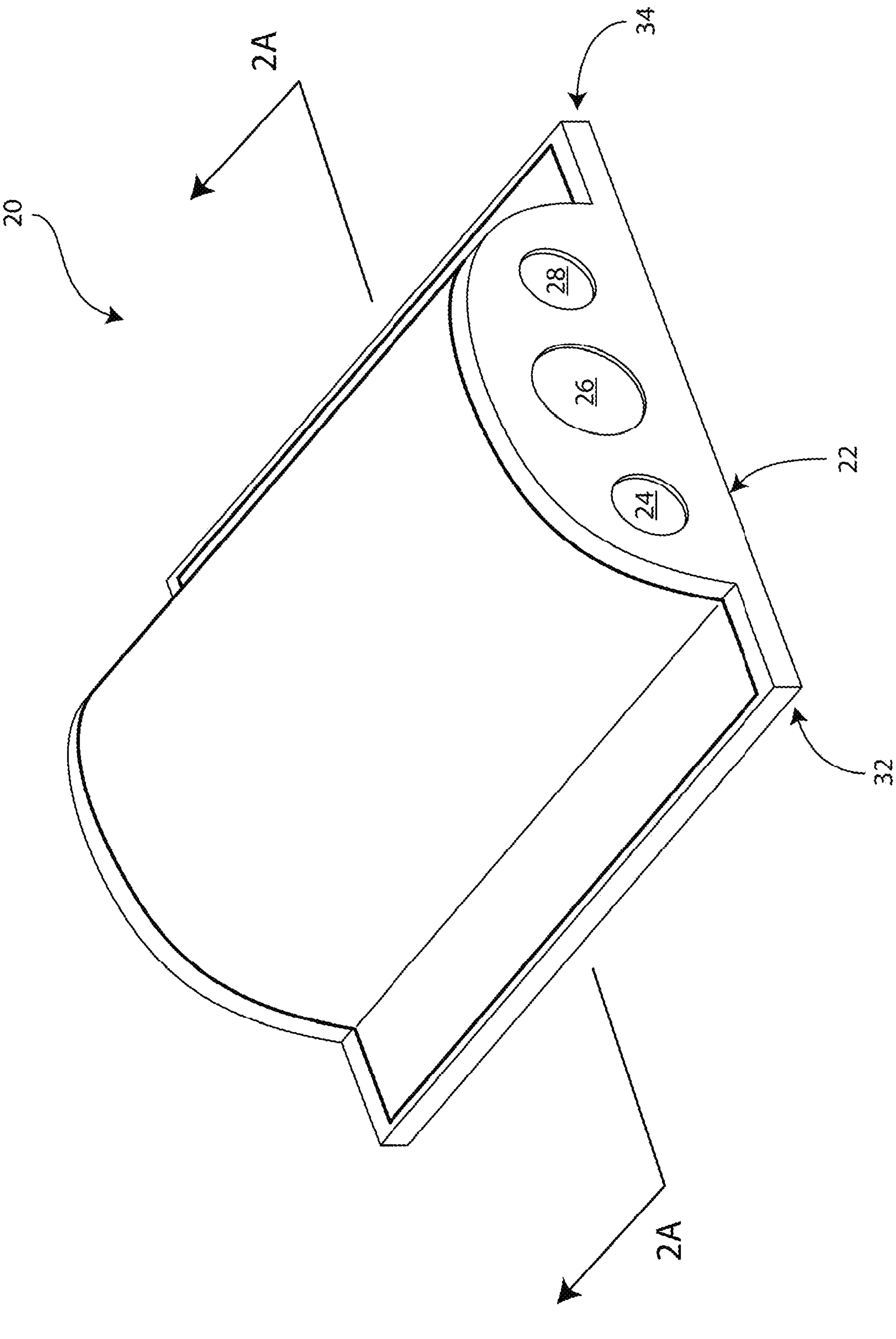
FIG. 1 is a perspective view of a system constructed in accordance with various embodiments of the present invention for manufacturing a core part, the system including a mandrel tool.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

An exemplary core part may comprise a sheet of aviation honeycomb core such as that sold under the trademark PLASCORE® and labeled with the part identification PCGA-XR2 3003 Aluminum Honeycomb as of the priority date of the present disclosure. One of ordinary skill will appreciate that a variety of honeycomb cores and other core parts may be utilized within the scope of the present invention.

A conventional sheet of aviation honeycomb core may be utilized in aerospace applications for structural reinforcement and sound attenuation. The honeycomb core sheet may be processed to form a final honeycomb core blanket, and may be incorporated between layers of skin to form a finished part. In order to complete the processing, at least one layer of skin (e.g., perforated skin) is fixed to a first (or bottom) side of the honeycomb core sheet. The perforated skin is, in turn, adhered and clamped to a tool surface to conform the honeycomb core sheet to a shape of the tool surface. Such skin may comprise a plurality of plies generally conforming to the shape of the tool surface. The skin may comprise thermoset composites or other composite materials known for use as skin in aerospace applications or the like.

Several stages of heating and curing are undertaken and the honeycomb core sheet expands and contracts adjacent the tool surface in response to the heating cycles. Moreover, the tool surface itself will likewise expand and contract with the heating cycles. Because of the way in which the honeycomb core sheet is held against the tool surface, the honeycomb core sheet will often deform away from the tool surface in places, leading to errors in sculpting and otherwise processing the honeycomb core sheet for the final product. In an attempt to reduce these occurrences, tools comprising materials having low CTEs may be employed, with consequent increase in manufacturing costs. Nonetheless, such deformation and inconsistencies persist.

Embodiments of the present invention, described in more detail below, provide an improved system and method for holding honeycomb core sheets (or other core parts) against a tool surface. These embodiments may permit improved maintenance of consistent three-dimensional shapes in the honeycomb core sheets throughout and following curing cycles, permit improved sculpting accuracy, and reduce costs of manufacture relative to existing systems. Moreover because the need to hold the core to the tool surface is temporary, embodiments of the present invention provide a means for removing the core from the tool with reduced or no damage to the core or the tool.

Figure 2B:
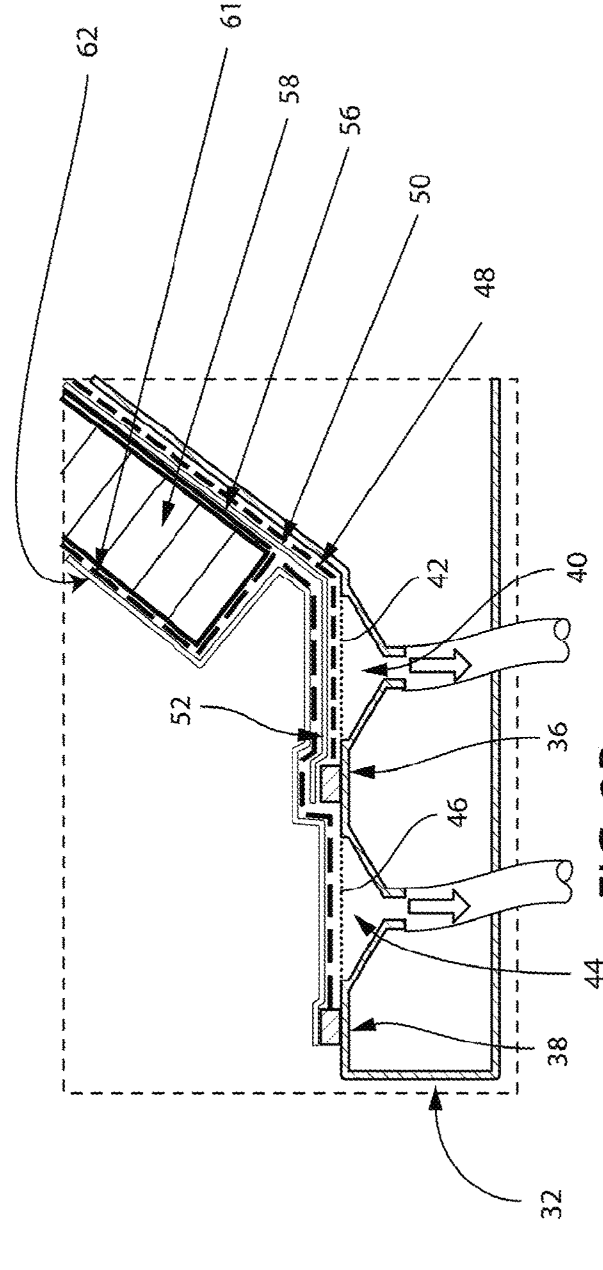
FIG. 2B is an enlarged view of a portion of the system of FIG. 2A, illustrating relative positioning of layers along a first edge flange of the mandrel tool that includes vacuum pressure sources or ports.
Figure 2A:
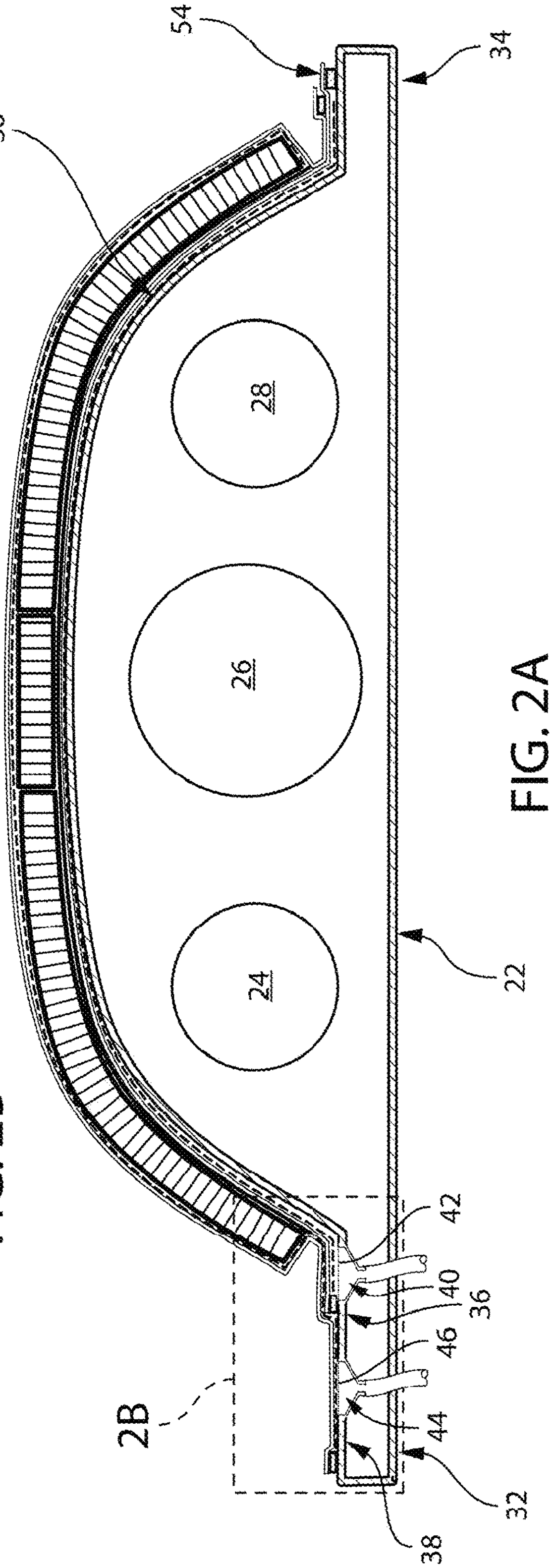
FIG. 2A is a schematized sectional front view of the system of FIG. 1, taken along line 2A-2A, illustrating simplified components to highlight layers on the mandrel tool and relative positions of the layers.

Embodiments of the technology will now be described in more detail with reference to the drawing figures. Referring to FIGS. 1 and 2A-2B, a system 20 constructed in accordance with various aspects of the current invention is shown. The system 20 may broadly comprise a mandrel tool 22 defining interior cavities 24, 26, 28. The cavities 24, 26, 28 may provide spaces through which air may be circulated, for example to assist in heating or cooling the tool 22. One of ordinary skill will appreciate that the cavities 24, 26, 28 may be omitted or otherwise configured within the scope of the present invention.

The mandrel tool 22 may comprise aluminum, steel (e.g., A36 steel), fiberglass, Invar (i.e., 64FeNi) and/or like rigid metals or composites. Embodiments of the present invention permit use of mandrel tools constructed of a variety of metals or composites—having a variety of coefficients of thermal expansion (CTEs)—through the use of improved systems and methods for preparing a honeycomb core and/or temporarily securing the honeycomb core to a mandrel tool for sculpting, as described in more detail below.

The tool 22 includes a face-sheet or shaping surface 30. The shaping surface 30 may be constructed to form an outer mold line—such as the half-barrel shaped outer mold line of FIG. 1—or another feature shape of a contoured part to be manufactured. The contoured parts manufactured with system 20 may include three-dimensional characteristics such as height, depth, curvature, contours, features that intersect at angles up to and including ninety degrees, or features that include a space between them. Such contoured parts are often utilized in the manufacturing of aircraft. An example of a contoured part that may be manufactured in part by utilizing the system 20 and using methods disclosed herein is a honeycomb core-reinforced nacelle wall having perforated skin. The tool 22 generally supports the contoured core during manufacturing, sculpting and/or curing processes.

The mandrel tool 22 also includes first and second edge flanges 32, 34 positioned along laterally opposite sides of the mandrel tool 22. The edge flanges 32, 34 respectively extend longitudinally along the periphery of the mandrel tool 22. It is foreseen that third and fourth edge flanges (not shown) may be incorporated along longitudinal ends of a mandrel tool, extending laterally therealong, without departing from the spirit of the present invention. The edge flanges 32, 34 may be substantially planar and/or may extend orthogonally away from adjacent portions of the shaping surface 30.

The edge flange 32 includes an inner portion 36 and an outer portion 38, the inner portion 36 being nearer the shaping surface 30. The inner portion 36 includes a first vacuum port 40 covered by a mesh screen 42. The first vacuum port 40 serves as a source of vacuum pressure that can be transmitted through the mesh screen 42 to layers extending over the edge flange 32 and over the shaping surface 30. The mesh screen 42 may be substantially rigid and gas-permeable, permitting movement of the vacuum pressure therethrough while preventing bunching of overlying layers within the first vacuum port 40. The mesh screen 42 may comprise perforated aluminum, steel or the like without departing from the spirit of the present invention.

The outer portion 38 of the edge flange 32 includes a second vacuum port 44 covered by a mesh screen 46. The second vacuum port 44 serves as a source of vacuum pressure that can be transmitted through the mesh screen 46 to layers extending over the outer portion 38 of the edge flange 32 and over the shaping surface 30. The mesh screen 46 may be constructed substantially the same as the first mesh screen 42 outlined above.

One of ordinary skill will appreciate that applying vacuum pressure to a space, as described herein, refers to reducing the pressure in that space. Where a mandrel tool is utilized in an ambient environment at atmospheric pressure, it will be understood that the application of vacuum pressure to a space along or adjacent a surface of the tool means reducing pressure in that space below atmospheric pressure. In the illustrated embodiment, pneumatic hoses are shown delivering vacuum pressures to the vacuum ports 40, 44. However, it is foreseen that various structure and parts for applying vacuum pressure may be implemented without departing from the scope of the present invention.

The system 20 also includes a gas-permeable breather sheet 48 (see FIGS. 3A-3B) covering the shaping surface 30 and extending along the inner portion 36 of the edge flange 32. The breather sheet 48 may comprise non-woven polyester/polyamide felt cloth or the like of a porosity sufficient to permit movement of air across and through the breather sheet 48 and evenly-distributed application of vacuum pressure across adjacent gas-impermeable layers (discussed in more detail below). An exemplary breather cloth is sold as of the priority date of the present disclosure under the trademark FIBRE GLAST® and part number 579.

One of ordinary skill will appreciate that a breather sheet may be supplemented or replaced with other structure and/or layers capable of distributing applied vacuum pressure across adjacent layers within the scope of the present invention. For example, a shaping surface may comprise texturing such as grooves, grids or other patterns imprinted or etched therein, providing pathways for distributing applied vacuum pressure thereacross. For another example, a breather sheet may be replaced by a silicone bag or the like embossed with such texturing or patterns for distributing applied vacuum pressure across overlying impermeable layers.

The breather sheet 48 is covered by a lower vacuum bag 50 (see FIGS. 4A-4B) also extending along the inner portion 36 of the edge flange 32. The vacuum bag 50 is generally manufactured from a flexible and resilient material such as cured silicone rubber, nylon, polyurethane and/or fiber-reinforced versions of the foregoing (or other similar materials) that allows the vacuum bag 50 to adapt to curvatures and contours of the shaping surface 30. The flexible material of the vacuum bag 50 may be substantially or completely impermeable to the atmosphere and/or other gases. Preferably, the flexible material of the vacuum bag 50 is impermeable to atmosphere at a pressure differential of fifteen pounds per square inch (15 psi). More preferably, the flexible material of the vacuum bag 50 is impermeable to atmosphere at a pressure differential of one hundred pounds per square inch (100 psi) or greater. In addition, the vacuum bag 50 may be reusable in that the bag may be used repeatedly to manufacture a plurality of contoured parts. It should also be noted that it is preferable for the vacuum bag 50 to be smoothly distributed across the shaping surface 30 to prevent bunching and sufficiently thin so as to minimize the effect of wrinkles or bunching in the bag 50 on the shape of the shaping surface 30.

The vacuum bag 50 includes a perimeter portion 52 that extends along the inner portion 36 beyond the first vacuum port 40 to seal against the edge flange 32. The vacuum bag 50 also includes a perimeter portion 54 extends along and seals against the edge flange 34. The perimeter portions 52, 54 may respectively be adhered to/sealed against the edge flanges 32, 34 using mud or putty-like materials and/or double-sided adhesive tape or the like sufficient to form an air-tight seal for application of vacuum pressure from the first vacuum port 40 to the vacuum bag 50.

The system 20 also includes a resin pre-impregnated ply or wet peel ply 56 (see FIGS. 5A-5B) layered over the vacuum bag 50. Wet peel ply 56 may comprise a sheet of polyester peel ply support carrier pre-impregnated with resin (e.g., 48% nominal). An exemplary wet peel ply is sold under the trademark Hysol® EA 9895™ Peel Ply as of the priority date of the present disclosure. One of ordinary skill will appreciate that other types of wet peel plies, double-sided adhesive tapes and/or the like may be used without departing from the spirit of the present invention.

Figure 6B:
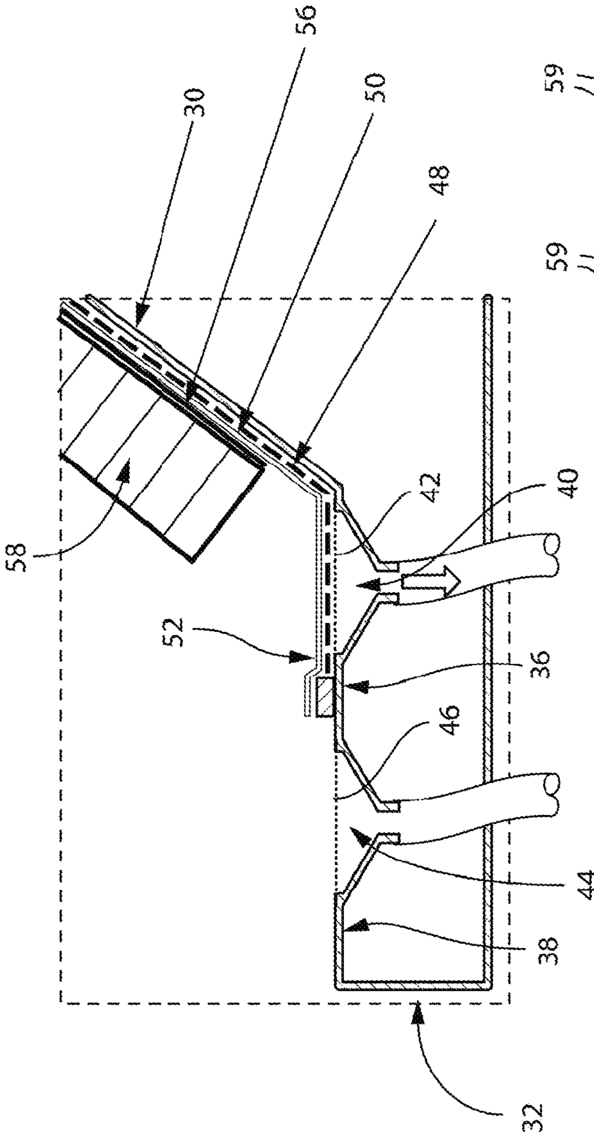
FIG. 6B is an enlarged view of a portion of the system of FIG. 6A, illustrating relative positioning of the honeycomb core part along the wet peel ply.
Figure 6A:
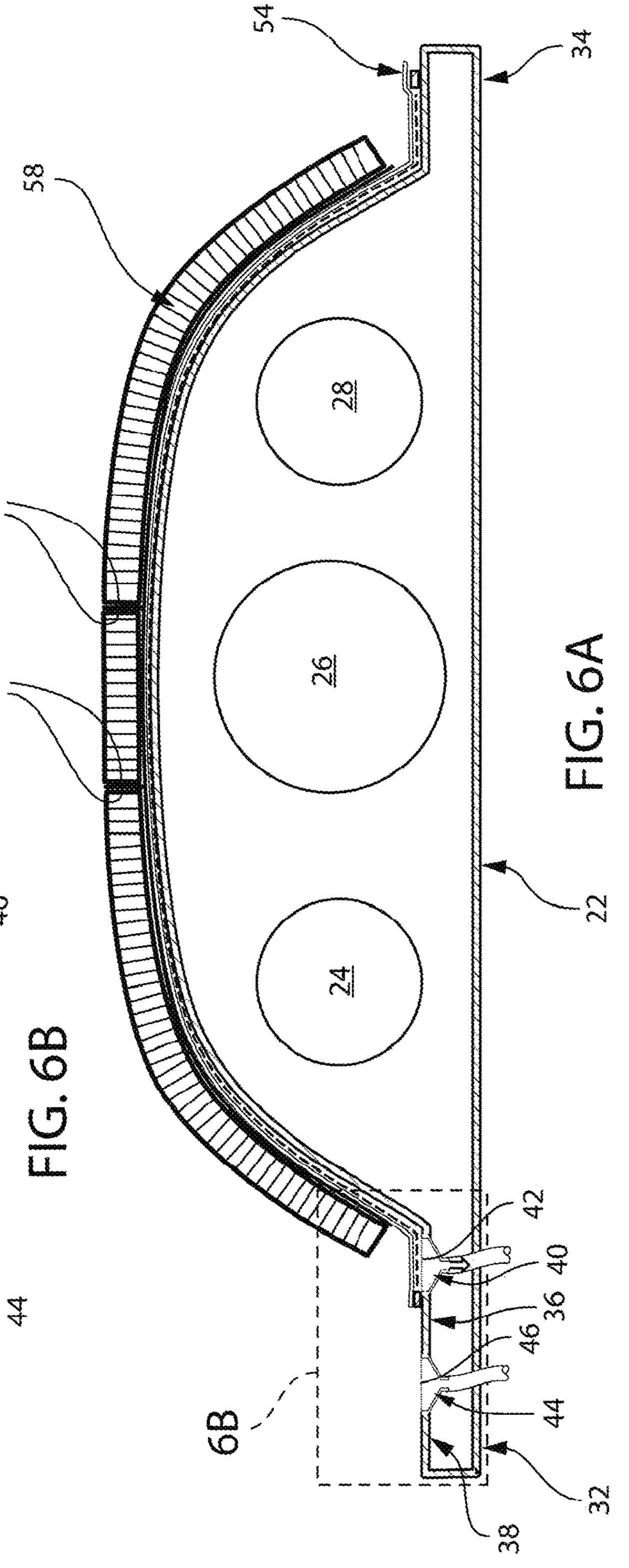
FIG. 6A is a partial view of the system of FIG. 2A, illustrating a honeycomb core part over the wet peel ply.

The system 20 also includes a core part 58 (see FIGS. 6A-6B). As outlined above, the core part 58 preferably comprises a plurality of aviation honeycomb core sheets or details joined by core splice adhesive. More particularly, each piece of the core part 58 may include one or more interface surfaces 59. Core splice adhesive may be applied to one or both of adjacent interface surfaces 59. Core splice adhesive may comprise low density, epoxy based and expandable adhesives for splicing honeycomb cores, as is commonly known. One of ordinary skill will appreciate that other adhesives may be used to join the sheets of honeycomb core without departing from the spirit of the present invention.

The core part 58 may also have a thickness T, which may be uniform throughout the core part 58 or local to a portion of the core part 58.

Each sheet may be bent initially to a general approximation of a corresponding shape of the shaping surface 30 along which it will sit. However, one of ordinary skill will appreciate that such initial or preliminary bending may not be required within the scope of the present invention.

The wet peel ply 56 is preferably substantially co-extensive with the core part 58, with the combination being layered over an area of the vacuum bag 50 above the shaping surface 30. The illustrated wet peel ply 56 and core part 58 do not extend over the edge flanges 32, 34 as illustrated; however, it is foreseen that such extension may occur without departing from the spirit of the present invention.

Figure 7B:
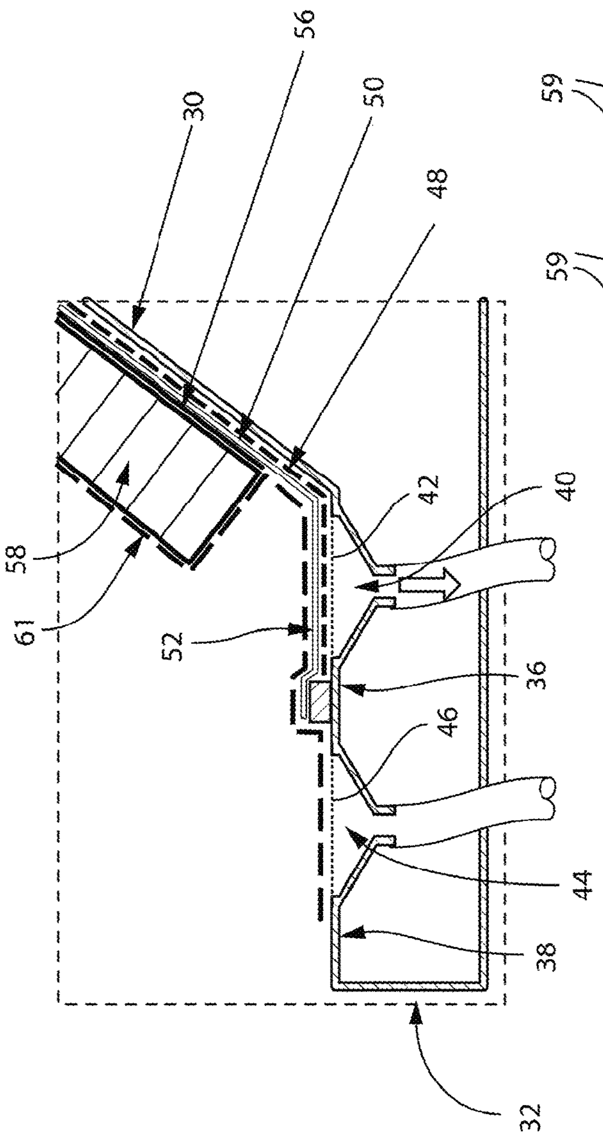
FIG. 7B is an enlarged view of a portion of the system of FIG. 7A, illustrating relative positioning of the upper breather sheet along the first edge flange of the mandrel tool.
Figure 7A:
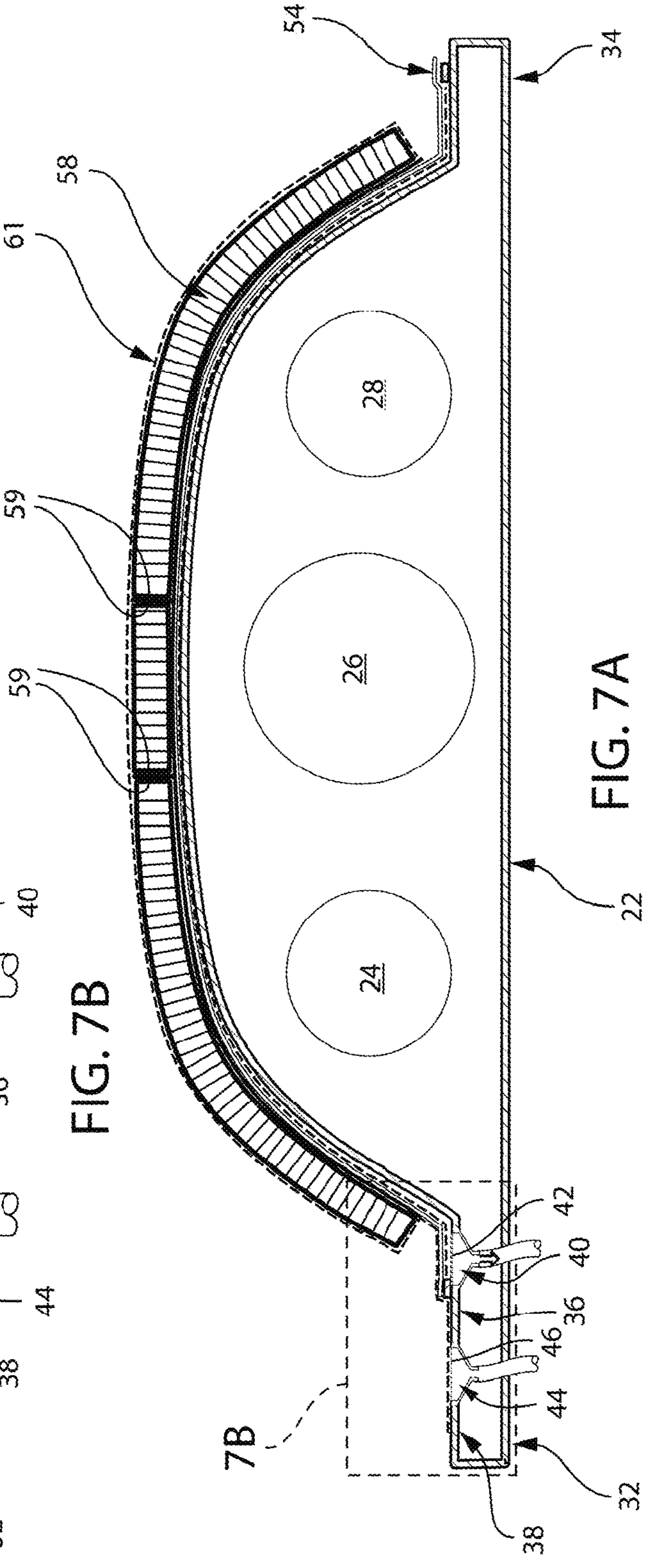
FIG. 7A is a partial view of the system of FIG. 2A, illustrating an upper breather sheet over the honeycomb core.
Figure 8B:
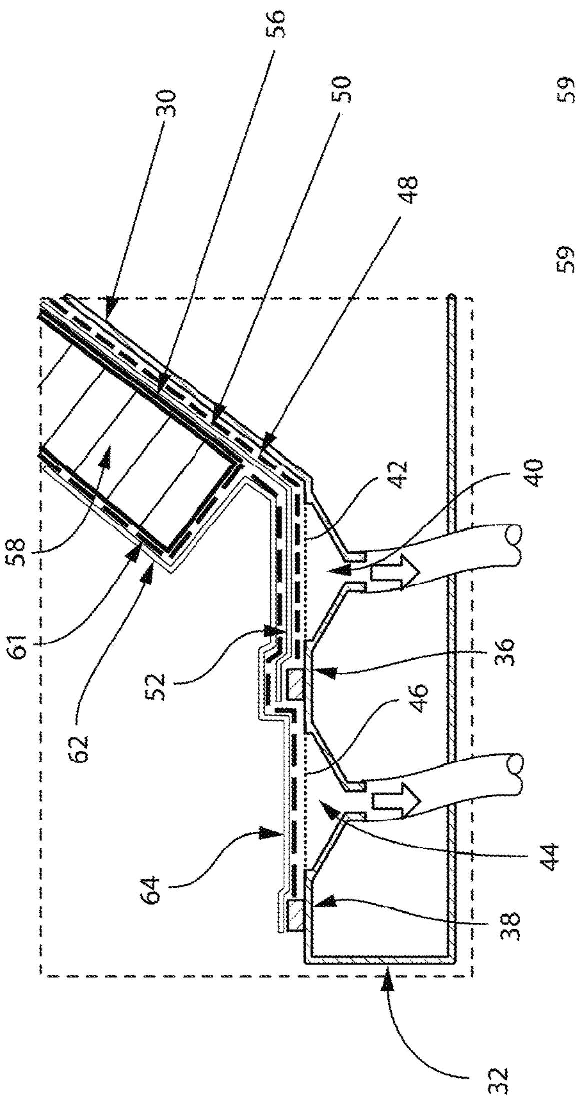
FIG. 8B is an enlarged view of a portion of the system of FIG. 8A, illustrating relative positioning of the upper vacuum bag along the first edge flange of the mandrel tool.
Figure 8A:
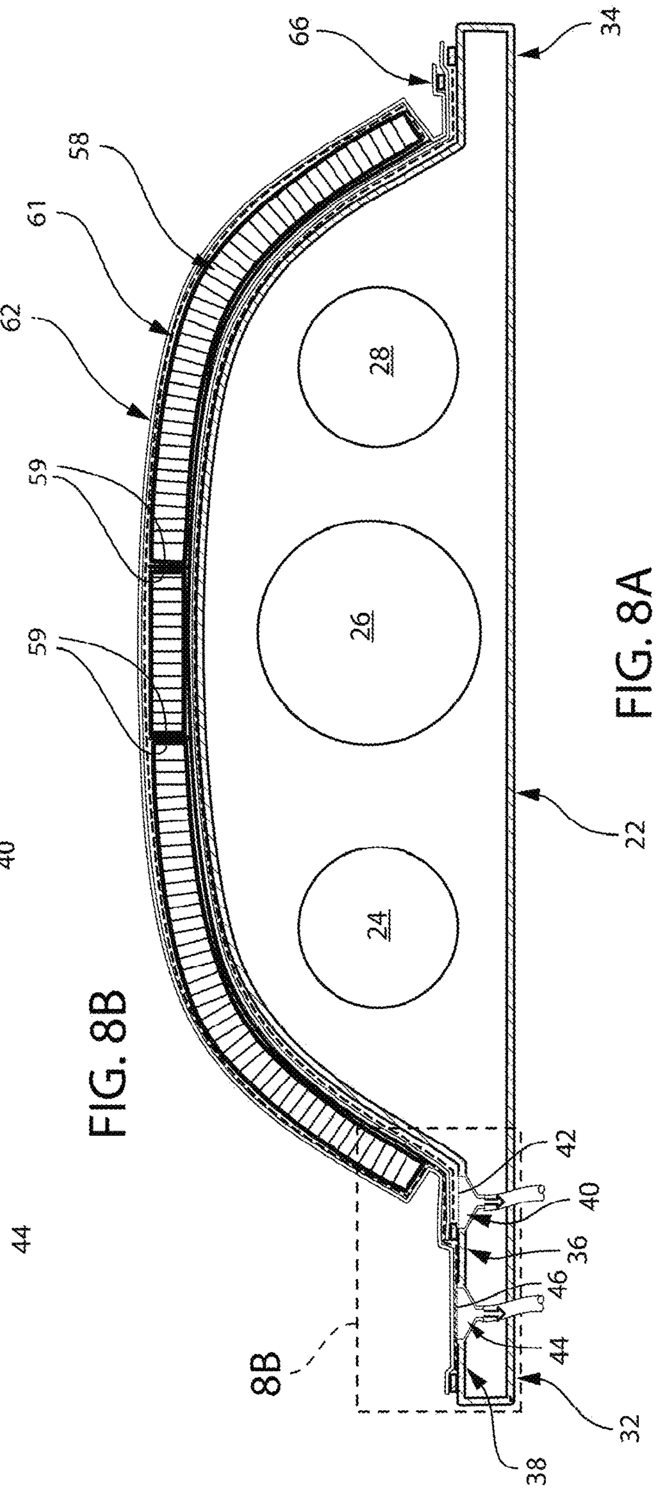
FIG. 8A is a partial view of the system of FIG. 2A, illustrating an upper vacuum bag over the upper breather sheet.

The system 20 may also include an upper breather sheet 61 (see FIGS. 7A-7B) and upper vacuum bag 62 (see FIGS. 8A-8B). The upper breather sheet 61 and the upper vacuum bag 62 cover the core part 58, and may be respectively constructed similarly to corresponding lower breather sheet 48 and vacuum bag 50. The upper vacuum bag 62 includes a perimeter portion 64 that extends along the outer portion 38 of the edge flange 32, beyond the first vacuum port 40 and the second vacuum port 44, and seals against the edge flange 32. The vacuum bag 62 also includes a perimeter portion 66 that extends along and seals against the edge flange 34 and/or a top surface of the vacuum bag 50. The perimeter portions 64, 66 may respectively be adhered to/sealed using mud or putty-like materials and/or double-sided adhesive tape or the like sufficient to form an air-tight seal for application of vacuum pressure from the second vacuum port 44 to the upper vacuum bag 62.

One of ordinary skill will appreciate that sealing along perimeter portions of a vacuum bag (such as vacuum bags 50, 62) and against a mandrel tool may be achieved by a number of structures, fasteners, adhesives or the like. Moreover, one of ordinary skill will appreciate that a seal about the mandrel tool that incorporates a vacuum port therein (e.g., port 40 or 44) preferably extends about an entirety of a perimeter of a vacuum bag, thereby preventing leakage of the vacuum pressure from (or ventilation of) the space underneath the vacuum bag. It is foreseen that such sealing may extend along longitudinal end portions of a mandrel in substantially the same manner as described above without departing from the spirit of the present invention.

As outlined above, the vacuum bags 50, 62 seal against the edge flanges 32, 34 (and/or an underlying layer) and other surfaces of the tool 22 along the periphery of the bags 50, 62.

Figure 12:
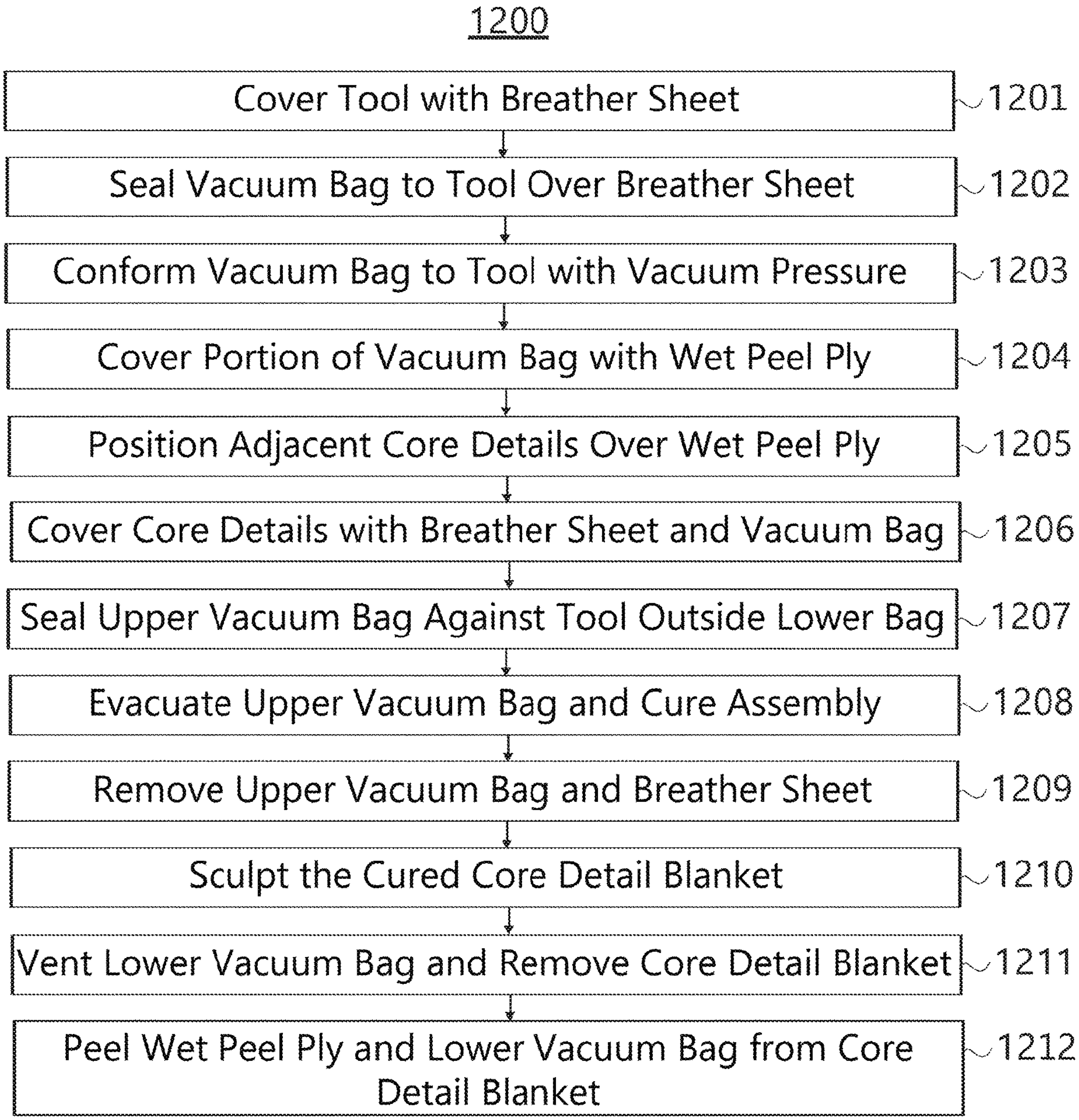
FIG. 12 illustrates at least a portion of the steps of an exemplary method for preparing a part using a rigid tool surface having a shape according to an embodiment of the present invention.

At least a portion of the steps of a method 1200 for manufacturing a core part using the system 20 in accordance with various embodiments of the present invention is listed in FIG. 12. The steps may be performed in the order as shown in FIG. 12, or they may be performed in a different order. Further, some steps may be performed concurrently as opposed to sequentially. In addition, some steps may be omitted. Still further, embodiments of the present invention may be performed using systems other than system 20 without departing from the spirit of the present invention.

Figure 3B:
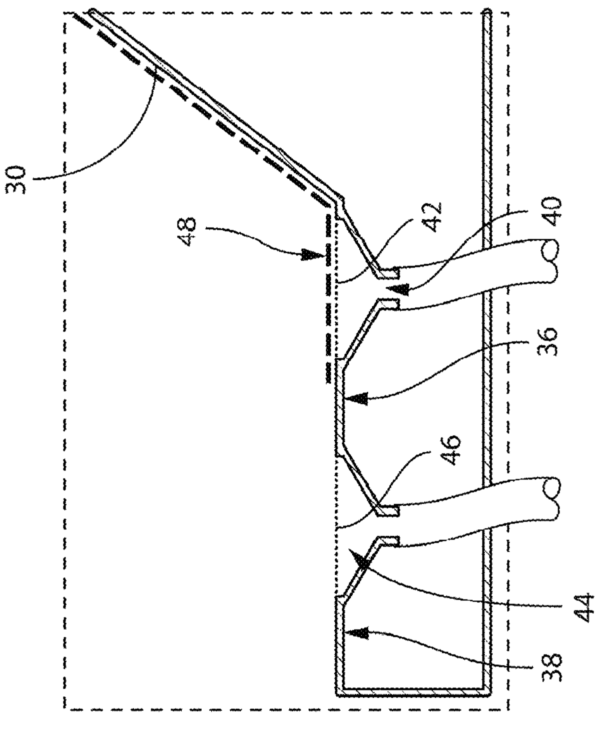
FIG. 3B is an enlarged view of a portion of the system of FIG. 3A, illustrating relative positioning of the breather sheet along the first edge flange of the mandrel tool.
Figure 3A:
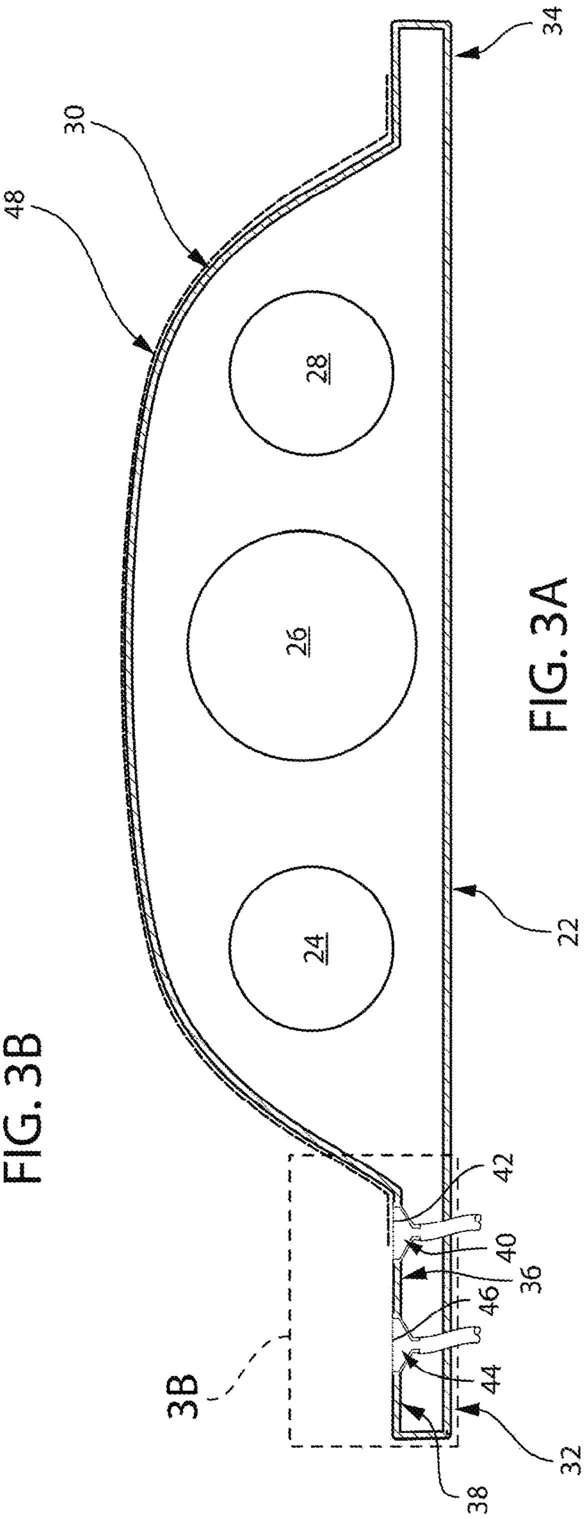
FIG. 3A is a partial view of the system of FIG. 2A, illustrating a lower breather sheet positioned adjacent a surface of the rigid tool.

In connection with step 1201, and with reference to FIGS. 3A-3B, a lower breather sheet may be applied over a shaping surface of a mandrel tool. More particularly, a lower side of the breather sheet may be placed adjacent or against the shaping surface.

Figure 4B:
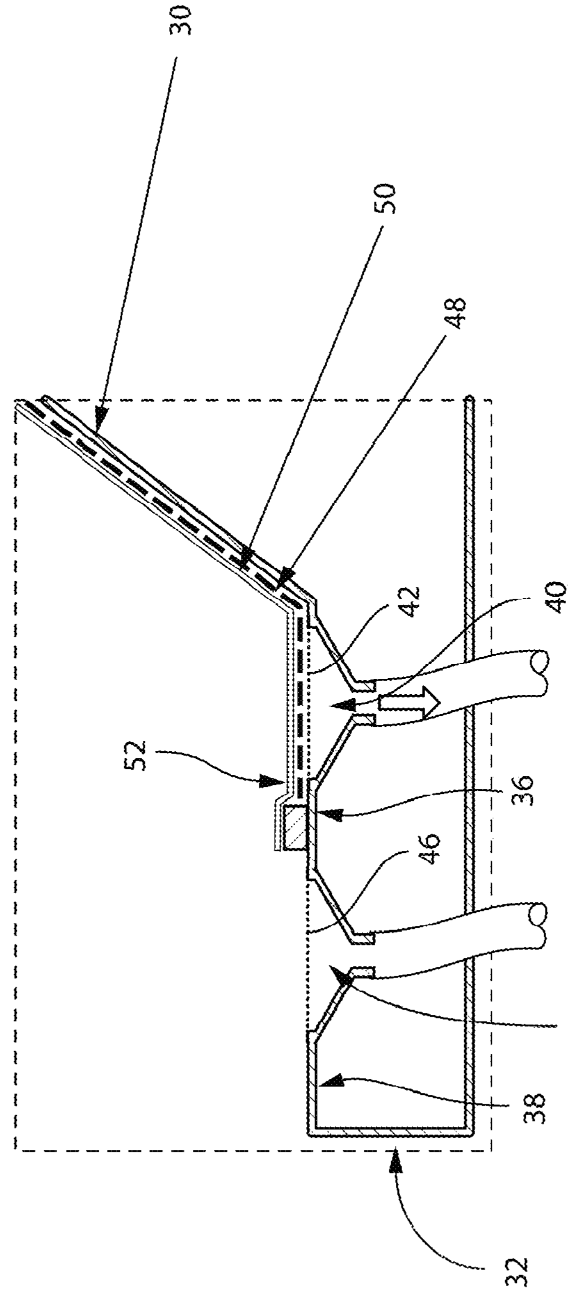
FIG. 4B is an enlarged view of a portion of the system of FIG. 4A, illustrating relative positioning of the lower vacuum bag along the first edge flange of the mandrel tool.
Figure 4A:
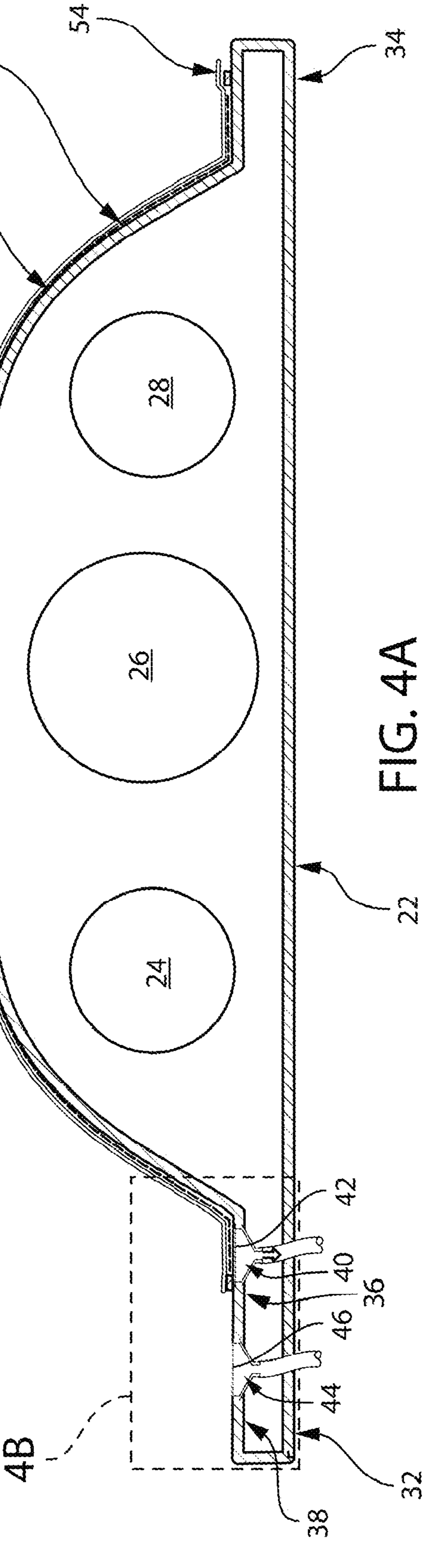
FIG. 4A is a partial view of the system of FIG. 2A, illustrating a lower vacuum bag over the lower breather sheet.

In connection with step 1202, and with reference to FIGS. 4A-4B, a lower vacuum bag may be applied over the lower breather sheet and sealed to the mandrel tool. More particularly, a lower side of the vacuum bag may be placed adjacent or against an upper side of the lower breather sheet. Perimeter portions of the vacuum bag may be sealed against perimeter portions of the mandrel tool using mud or putty-like materials and/or double-sided adhesive tape or the like sufficient to form an air-tight seal for application of vacuum pressure under the lower vacuum bag.

In connection with step 1203, vacuum pressure may be applied to the lower side of the lower vacuum bag. The vacuum pressure may suction the vacuum bag (and, consequently, the underlying lower breather sheet) against the shape of the shaping surface of the mandrel tool. The vacuum pressure may be applied by a first vacuum port positioned along the mandrel tool inside the boundary seal around the lower vacuum sheet. The vacuum pressure may be maintained until step 1211 discussed below.

Figure 5B:
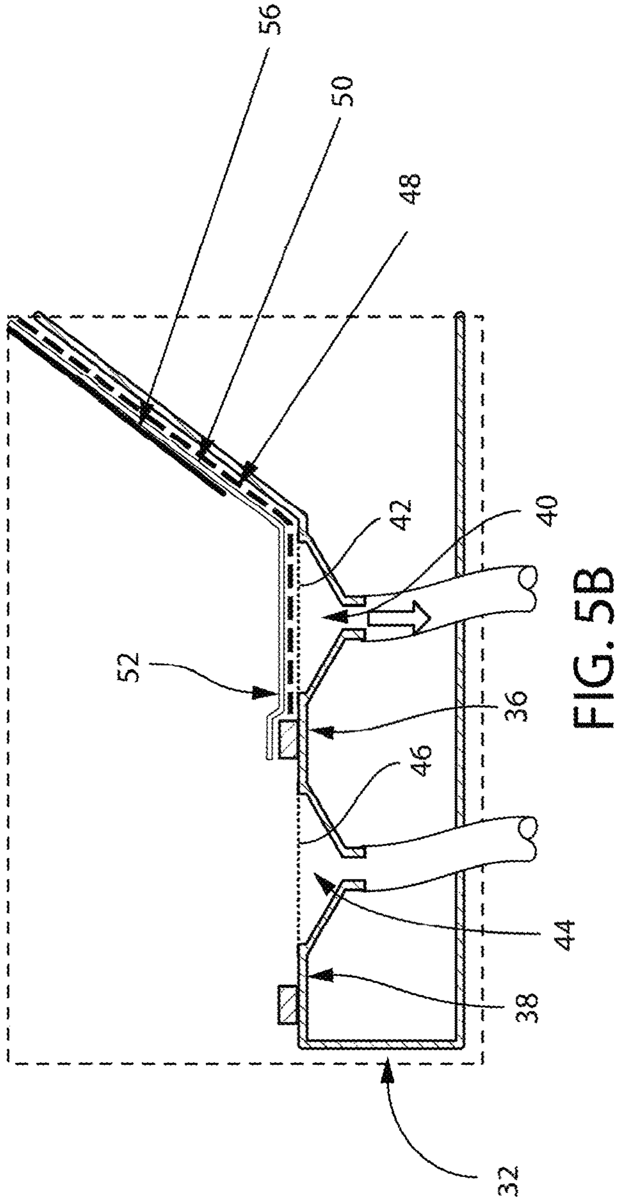
FIG. 5B is an enlarged view of a portion of the system of FIG. 5A, illustrating relative positioning of the wet peel ply along the first vacuum bag.
Figure 5A:
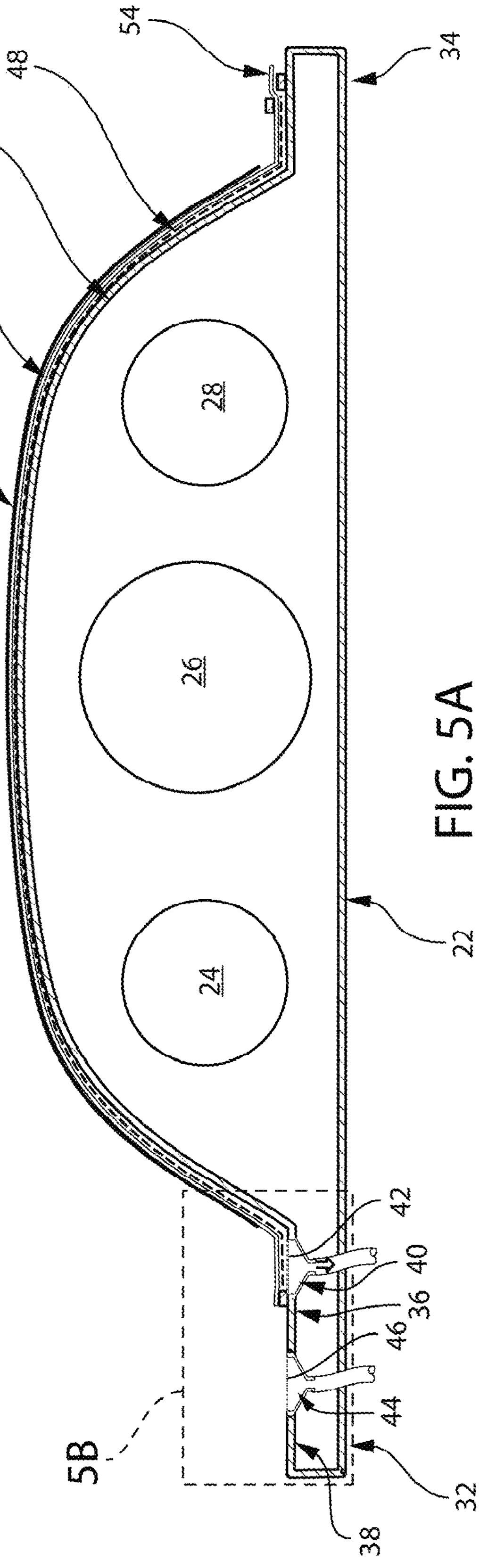
FIG. 5A is a partial view of the system of FIG. 2A, illustrating a wet peel ply over the first vacuum bag.

In connection with step 1204, and with reference to FIGS. 5A-5B, a wet peel ply may be applied over an area of the lower vacuum bag. More particularly, a lower side of the wet peel ply may be applied over the upper side of the lower vacuum bag across an area roughly co-extensive with an expected span or coverage of core details discussed in more detail below.

In connection with step 1205, and with reference to FIGS. 6A-6B, core details (e.g., pre-formed sheets of aviation honeycomb core) are placed along an upper side of the wet peel ply. More particularly, core splice adhesive may be applied to interface surfaces of adjacent sheets of honeycomb core, and the sheets may be lined up and pressed together at the interface surfaces atop the wet peel ply.

In connection with step 1206, and with reference to FIGS. 7A-8B, an upper breather sheet and upper vacuum bag are applied over the assembled sheets of honeycomb core. The upper vacuum bag generally extends outward along at least one perimeter portion of the mandrel tool beyond the corresponding perimeter portion of the lower vacuum bag.

In connection with step 1207, the perimeter portion of the upper vacuum bag that extends outward beyond a corresponding perimeter portion of the lower vacuum bag may be sealed against the mandrel tool. This perimeter portion of the upper vacuum bag may be in fluid communication with a second vacuum port of the mandrel tool. The remaining perimeter portions of the upper vacuum bag may optionally be sealed against the mandrel tool and/or against the lower vacuum bag or other gas-impermeable underlying layer.

In connection with step 1208, gas may be evacuated from beneath the upper vacuum bag. More particularly, the second vacuum port may apply vacuum pressure to the lower side of the upper vacuum bag to press it against the core details and, in turn, to press the core details against the wet peel ply. The vacuum pressure may be maintained against the upper vacuum bag until step 1209.

In addition, the assembly may be placed in an autoclave or otherwise heated to cure the wet peel ply and the core splice adhesive. The autoclave may be adapted for curing wet peel ply and/or core splice adhesives, as is generally known in the art. One of ordinary skill will appreciate that various heating or other means may be utilized to cure the wet peel play and/or core splice adhesive without departing from the spirit of the present invention.

Figure 9B:
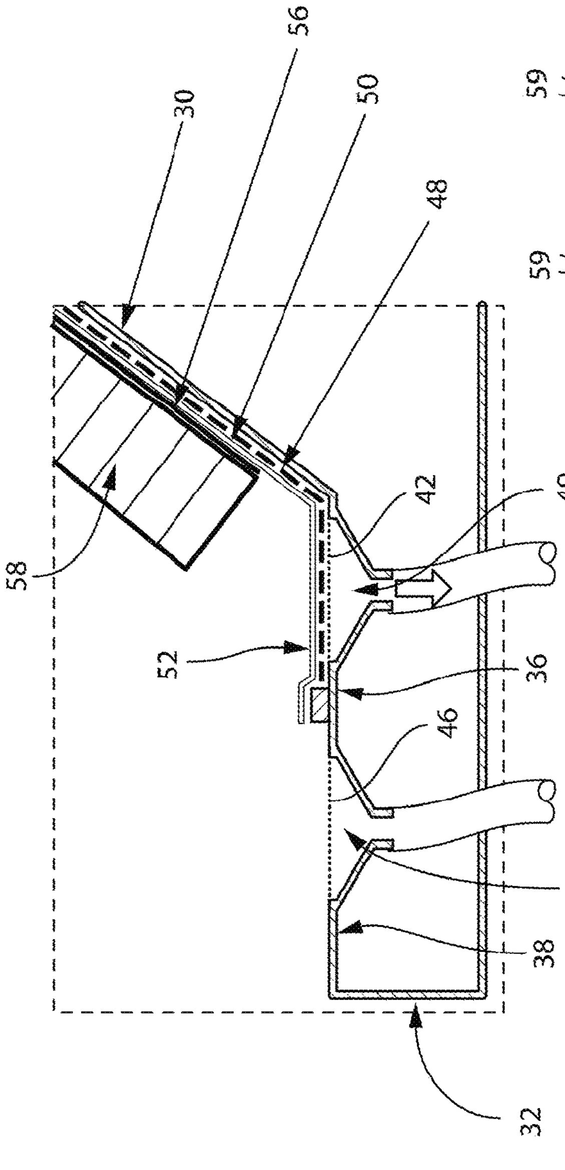
FIG. 9B is an enlarged view of a portion of the system of FIG. 9A, illustrating application of vacuum pressure by the one of the vacuum pressure sources during the sculpting process.
Figure 9A:
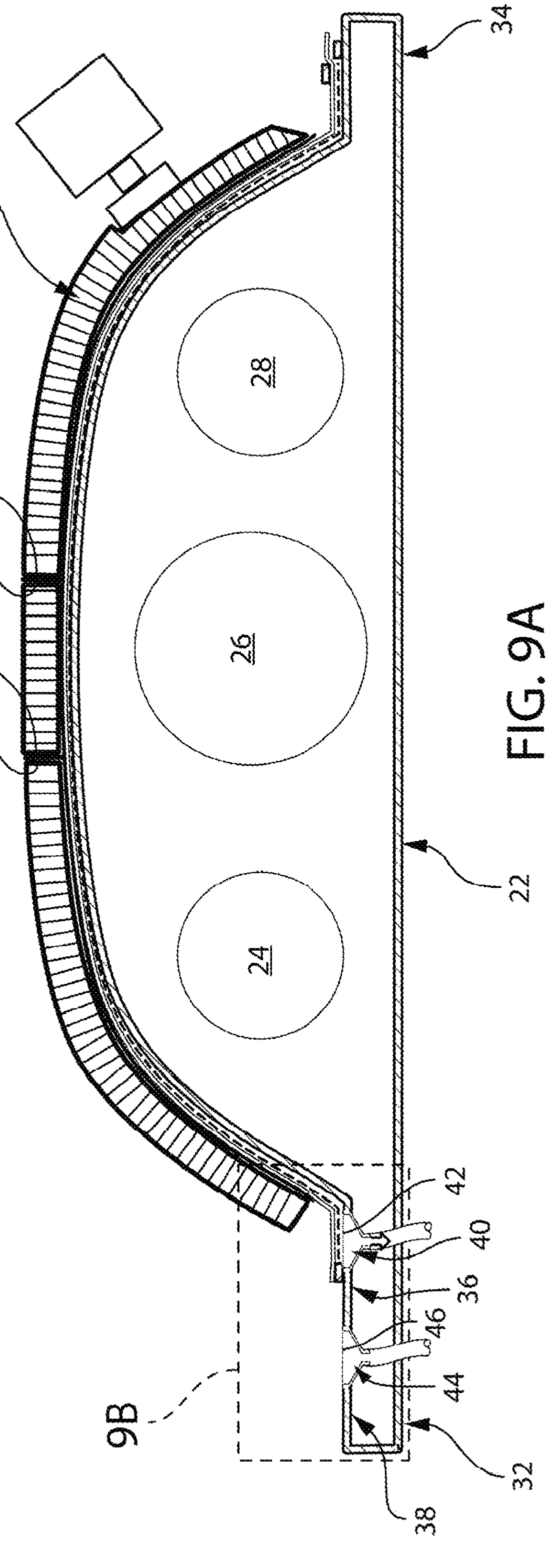
FIG. 9A is a supplemented partial view of the system of FIG. 2A, omitting the upper vacuum bag and breather sheet and illustrating sculpting of the honeycomb core part by a machine tool.

In connection with step 1209, and with reference to FIGS. 9A-9B, the upper vacuum bag and upper breather sheet may be removed from the cured core detail blanket. More particularly, the vacuum pressure from the second vacuum port may be released after the heating step to ventilate the underside of the upper vacuum bag. Subsequently, the upper vacuum bag and upper breather sheet may be removed.

In connection with step 1210, the core detail blanket may be sculpted using a machine tool. More particularly, the machine tool may be applied across a top side of the core detail blanket to reduce the thickness thereof and move the core detail blanket toward a finished three-dimensional shape and thickness, as is commonly known in the art.

Figure 10:
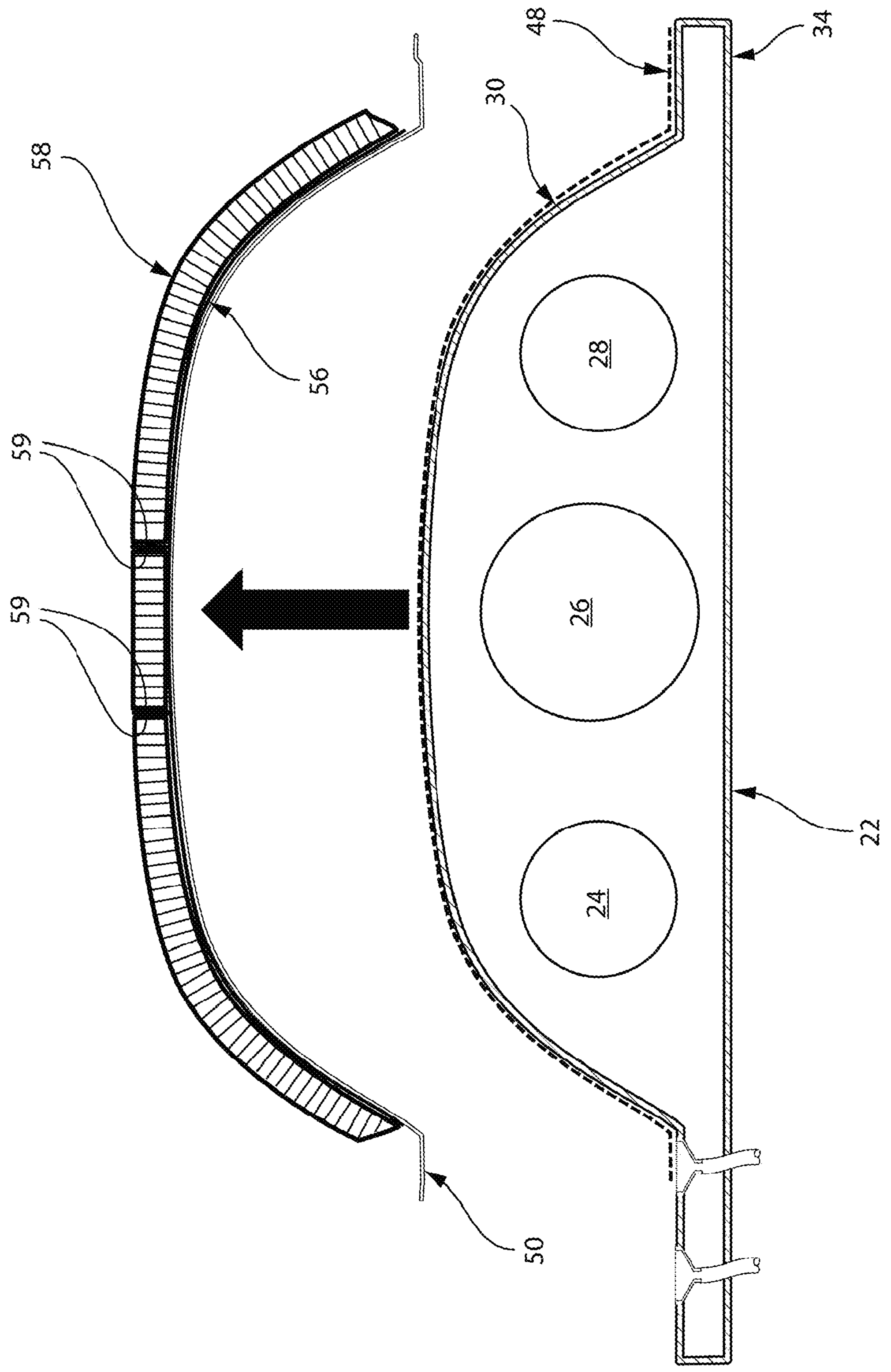
FIG. 10 is a partial view of the system of FIG. 2A, illustrating removal of the sculpted honeycomb core, the peel ply, and the lower vacuum bag collectively following curing of core splice details and the peel ply and release of the vacuum pressure by the vacuum pressure source.

In connection with step 1211, and with reference to FIG. 10, the lower vacuum bag may be ventilated and the core detail blanket may be removed from the mandrel tool. More particularly, the vacuum pressure from the first vacuum port may be released and the underside of the lower vacuum bag ventilated to permit removal of the core detail blanket with cured wet peel ply and lower vacuum bag attached.

Figure 11:
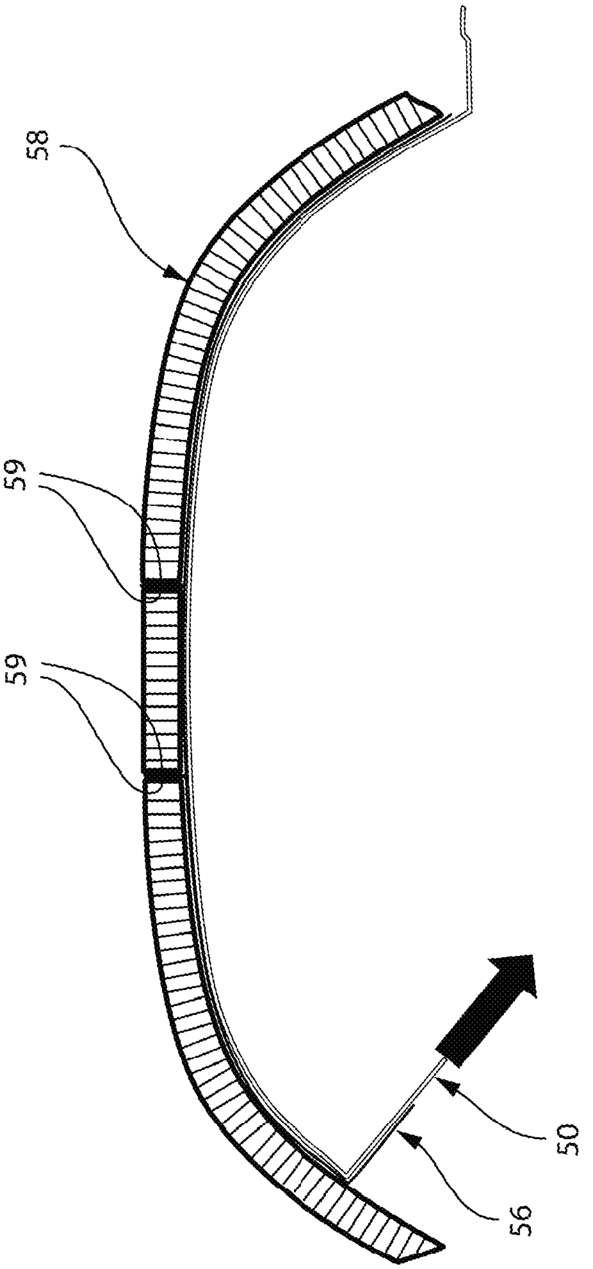
FIG. 11 is a partial view of the system of FIG. 10, illustrating removal of the peel ply and the lower vacuum bag from the honeycomb core.

In connection with step 1212, and with reference to FIG. 11, the wet peel ply (with lower vacuum bag attached) may be peeled away from the core detail blanket.

Embodiments of the present invention therefore provide an improved system and method for holding honeycomb core sheets (or other core parts) against a tool surface. These embodiments may permit improved maintenance of consistent three-dimensional shapes in the honeycomb core sheets throughout and following curing cycles, permit improved sculpting accuracy, and reduce costs of manufacture relative to existing systems. Moreover, preferred embodiments permit the core blanket to be spliced and sculpted before being attached to skin or carbon face-sheet(s) having low CTEs, thus reducing the likelihood of node bond failure and cell wall tears that might otherwise occur due to or during cool-down due to CTE mismatch stresses.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for preparing a part using a rigid tool surface having a shape, the system comprising:
- a cellular core structure for forming the part;
- a vacuum bag positioned over the rigid tool surface and being under vacuum pressure conforming the vacuum bag to the shape of the rigid tool surface, wherein the vacuum pressure is applied between the vacuum bag and the tool; and
- a resin pre-impregnated ply positioned over the vacuum bag opposite the rigid tool surface,
- wherein the cellular core structure is positioned over the ply opposite the vacuum bag.

2. The system of claim 1, further comprising—
- a second vacuum bag positioned adjacent the cellular core structure opposite the ply and being under a second vacuum pressure pressing the cellular core structure against the ply.

3. The system of claim 1, wherein the cellular core structure comprises a honeycomb core.

4. The system of claim 3, wherein the honeycomb core comprises at least one of fiberglass and aluminum.

5. The system of claim 1, further comprising—
- a breather sheet applied between the rigid tool surface and the vacuum bag.

6. The system of claim 1, wherein the rigid tool comprises one or more of aluminum, steel and fiberglass.

7. The system of claim 1, wherein the cellular core structure comprises two pieces each having an interface surface.

8. The system of claim 7, further comprising adhesive adhering the interface surfaces of the two pieces to one another.

9. The system of claim 1, wherein the cellular core structure has at least two (2) thicknesses including a reduced thickness.

10. The system of claim 1, wherein the pre-impregnated ply comprises a sheet of polyester peel ply support carrier pre-impregnated with resin.

11. The system of claim 1, wherein—
- the vacuum bag comprises a first perimeter portion and a substantially opposite second perimeter portion,
- the rigid tool comprises a first perimeter portion and a substantially opposite second perimeter portion,
- the first perimeter portion of the vacuum bag is sealed against the first perimeter portion of the rigid tool and the second perimeter portion of the vacuum bag is sealed against the second perimeter portion of the rigid tool.

12. The system of claim 11, wherein the respective perimeter portions of the vacuum bag are releasably sealed to the corresponding perimeter portions of the rigid tool.

13. The system of claim 1, wherein the vacuum bag is a first vacuum bag and wherein the first vacuum bag is under vacuum pressure from a first vacuum source, the system further comprising—
- a second vacuum bag positioned over the cellular core structure and being under vacuum pressure from a second vacuum source conforming the second vacuum bag to the shape of the cellular core structure.

14. The system of claim 13, further comprising—
- a breather sheet placed between the cellular core structure and the second vacuum bag, the breather sheet comprising gas-permeable material.

15. The system of claim 13, wherein the first and second vacuum sources are configured for independent application of pressure and corresponding independent release respectively of the first and second vacuum bags.

16. The system of claim 13, wherein—
- each of the first and second vacuum bags comprises a perimeter portion,
- the rigid tool comprises a perimeter portion,
- the perimeter portions of the first and second vacuum bags are sealed against the perimeter portion of the rigid tool.

17. The system of claim 16, wherein—
- the perimeter portion of the rigid tool comprises an edge flange having an inner portion nearer the cellular core structure and an outer portion further from the cellular core structure,
- the perimeter portion of the vacuum bag is sealed against the inner portion of the edge flange,
- the perimeter portion of the second vacuum bag is sealed against the outer portion of the edge flange,
- the vacuum pressure supplied by the first vacuum source is along the inner portion of the edge flange,
- the vacuum pressure supplied by the second vacuum source is along the outer portion of the edge flange.

18. The system of claim 13, wherein each of the first and second vacuum sources comprises a vacuum port configured to deliver vacuum pressure across a substantially rigid and gas-permeable mesh screen.

19. A system for preparing a part using a rigid tool surface having a shape, the system comprising:
- a vacuum bag positioned over the rigid tool surface and being under vacuum pressure conforming the vacuum bag to the shape of the rigid tool surface; and
- a resin pre-impregnated ply positioned adjacent the vacuum bag opposite the rigid tool surface,
- wherein the part is positioned adjacent the ply opposite the vacuum bag;
- wherein the resin pre-impregnated ply is cured and is attached to the vacuum bag, the attached ply and vacuum bag being configured to be peeled away from the part.

20. The system of claim 19, wherein the resin pre-impregnated ply comprises a wet peel ply.

21. The system of claim 1, wherein the resin pre-impregnated ply is cured and is attached to the vacuum bag, the attached ply and vacuum bag being configured to be peeled away from the part.

* * * * *